(12) United States Patent
Yamashita et al.

(10) Patent No.: US 9,132,518 B2
(45) Date of Patent: Sep. 15, 2015

(54) METHOD FOR PRODUCING ALUMINUM ALLOY HEAT EXCHANGER

(75) Inventors: Naoki Yamashita, Tokyo (JP); Yuji Hisatomi, Tokyo (JP)

(73) Assignee: SUMITOMO LIGHT METAL INDUSTRIES, LTD., Minato-ku, Tokyo (JP)

( * ) Notice: Subject to any disclaimer, the term of this patent is extended or adjusted under 35 U.S.C. 154(b) by 149 days.

(21) Appl. No.: 13/699,182

(22) PCT Filed: May 10, 2011

(86) PCT No.: PCT/JP2011/060729
§ 371 (c)(1),
(2), (4) Date: Feb. 1, 2013

(87) PCT Pub. No.: WO2011/148781
PCT Pub. Date: Dec. 1, 2011

(65) Prior Publication Data
US 2013/0118013 A1    May 16, 2013

(30) Foreign Application Priority Data
May 25, 2010    (JP) .................. 2010-119218

(51) Int. Cl.
| | |
|---|---|
| B23P 15/26 | (2006.01) |
| B23K 1/00 | (2006.01) |
| B23K 1/008 | (2006.01) |
| B23K 1/20 | (2006.01) |
| B23K 35/00 | (2006.01) |
| B23K 35/28 | (2006.01) |
| B23K 35/365 | (2006.01) |
| C22C 21/00 | (2006.01) |
| F28F 1/02 | (2006.01) |
| F28F 1/12 | (2006.01) |
| F28F 21/08 | (2006.01) |
| C23C 26/02 | (2006.01) |
| C23C 30/00 | (2006.01) |

(52) U.S. Cl.
CPC ................. *B23P 15/26* (2013.01); *B23K 1/008* (2013.01); *B23K 1/0012* (2013.01); *B23K 1/203* (2013.01); *B23K 35/002* (2013.01); *B23K 35/28* (2013.01); *B23K 35/282* (2013.01); *B23K 35/365* (2013.01); *C22C 21/00* (2013.01); *C23C 26/02* (2013.01); *C23C 30/00* (2013.01); *F28F 1/022* (2013.01); *F28F 1/126* (2013.01); *F28F 21/084* (2013.01); *F28F 21/089* (2013.01); *B23K 2201/14* (2013.01); *F28F 2255/16* (2013.01); *Y10T 29/49378* (2015.01)

(58) Field of Classification Search
CPC ...... B23K 35/28; B23K 35/365; B23K 1/008; B23K 35/002; B23K 1/203; B23K 35/282; B23K 2201/14; C23C 30/00; C23C 26/02; F28F 21/084; F28F 1/126; F28F 21/089; F28F 1/022; F28F 2255/16; C22C 21/00; Y10T 29/49378; B23P 15/26
USPC .......... 29/890.03, 890.043, 890.038, 890.054, 29/458, 460
See application file for complete search history.

(56) References Cited

U.S. PATENT DOCUMENTS

| | | | | | |
|---|---|---|---|---|---|
| 4,626,295 | A | * | 12/1986 | Sasaki et al. ................... | 148/528 |
| 5,316,206 | A | * | 5/1994 | Syslak et al. ................... | 228/183 |
| 6,896,977 | B2 | * | 5/2005 | Nishimura et al. ........... | 428/654 |
| 8,661,675 | B2 | * | 3/2014 | Minami et al. ........... | 29/890.043 |
| 2003/0051342 | A1 | * | 3/2003 | Hasegawa et al. ......... | 29/890.03 |
| 2003/0084569 | A1 | * | 5/2003 | Hyogo et al. .............. | 29/890.03 |
| 2005/0076506 | A1 | * | 4/2005 | Kanada .................... | 29/890.054 |
| 2007/0251091 | A1 | * | 11/2007 | Minami et al. ........... | 29/890.054 |

FOREIGN PATENT DOCUMENTS

| | | |
|---|---|---|
| DE | 10 2008 009 695 A1 | 9/2008 |
| JP | 11-183085 A1 | 7/1999 |
| JP | 2002-161323 A1 | 6/2002 |

(Continued)

OTHER PUBLICATIONS

Editorial Committee of Aluminum Brazing Handbook, "Aluminum Brazing Handbook (revised)", published on Mar. 25, 2003, p. 96.*

(Continued)

*Primary Examiner* — David P. Bryant
*Assistant Examiner* — Jason L Vaughan
(74) *Attorney, Agent, or Firm* — Flynn, Thiel, Boutell & Tanis, P.C.

(57) ABSTRACT

A method for producing an aluminum alloy heat exchanger includes applying a coating material prepared by mixing an Si powder, a flux powder, and a binder to a surface of a multiport flat refrigerant tube, assembling an aluminum alloy bare fin with the multiport flat refrigerant tube, and brazing the multiport flat refrigerant tube and the aluminum alloy bare fin to obtain an aluminum alloy heat exchanger, the multiport flat refrigerant tube being formed of an aluminum alloy extruded material that includes 0.5 to 1.7 mass % of Mn, less than 0.10 mass % of Si, and less than 0.10 mass % of Cu, with the balance being Al and unavoidable impurities, the aluminum alloy bare fin being a corrugated fin that is obtained by forming an Al—Mn—Zn alloy material, the coating material being prepared by mixing an Si powder, a Zn-containing compound flux powder, a Zn-free compound flux powder, and a binder, the Si powder being applied in an amount of 1 to 4 g/m$^2$, and the aluminum alloy heat exchanger obtained by brazing having a configuration in which a deep area of the refrigerant tube has the highest potential, and the potential decreases in order from a surface area of the refrigerant tube, a fin joint fillet, and the fin.

24 Claims, No Drawings

(56) References Cited

FOREIGN PATENT DOCUMENTS

| | | |
|---|---|---|
| JP | 2004-084060 A1 | 3/2004 |
| JP | 2005-060790 A1 | 3/2005 |
| JP | 2006-255755 A1 | 9/2006 |
| JP | 2007031730 A1 | 2/2007 |
| JP | 2007-178062 A1 | 7/2007 |
| JP | 2008-121108 A1 | 5/2008 |
| JP | 2008-208416 A1 | 9/2008 |
| JP | 2008-261025 A1 | 10/2008 |
| JP | 2009-058167 A1 | 3/2009 |
| JP | 2009-068083 A1 | 4/2009 |

OTHER PUBLICATIONS

Tanabe Zenichi, et al., "Corrosion Behavior of Zinc Diffusion Treated Aluminum Alloy Tub", Japan Society of Corrosion Engineering, vol. 23, No. 10, 1974, pp. 485-492.

Editorial Committee of Aluminum Brazing Handbook, "Aluminum Brazing Handbook (revised)", published on Mar. 25, 2003.

\* cited by examiner

METHOD FOR PRODUCING ALUMINUM ALLOY HEAT EXCHANGER

BACKGROUND

The invention relates to a method for producing an aluminum alloy heat exchanger.

An aluminum alloy has been normally used for an automotive heat exchanger (e.g., evaporator or condenser) due to its reduced weight and excellent thermal conductivity. Such a heat exchanger has been normally produced by applying a fluoride flux to the surface of an aluminum alloy extruded tube, assembling a member (e.g., fin material) with the aluminum alloy extruded tube to form a given structure, and brazing the aluminum alloy extruded tube and the assembled member in a heating furnace that contains an inert gas atmosphere, for example.

A multiport tube having a plurality of hollow areas (refrigerant passages) that are defined by a plurality of partitions is normally used as an extruded tube used to produce an automotive heat exchanger. In recent years, a reduction in weight of a heat exchanger has been desired in order to reduce the fuel consumption of automobiles from the viewpoint of reducing environmental impact, and a tube used to produce a heat exchanger has been reduced in thickness. Therefore, the cross-sectional area of the tube has been reduced, and a several hundred to several thousand extrusion ratio (cross-sectional area of container/cross-sectional area of extruded product) has been employed. Therefore, a pure aluminum material that exhibits excellent extrudability has been used taking account of the extrusion ratio.

It is expected that the weight of a heat exchanger and the thickness of a tube will be more and more reduced. Therefore, it is necessary to increase the strength of the tube material. It is effective to add Si, Cu, Mn, Mg, or the like in order to increase the strength of the tube material. When the brazing target material contains Mg, a fluoride flux that is melted during heating reacts with Mg in the material to produce compounds such as $MgF_2$ and $KMgF_3$. This reduces the activity of the flux, so that brazability significantly deteriorates. The addition of Cu significantly decreases extrudability, so that the die breaks, or the productivity decreases. Therefore, Si and Mn must be necessarily added in order to increase the strength of the tube material.

When adding Mn and Si to an alloy at a high concentration, Mn and Si dissolved in the matrix increase the deformation resistance of the alloy. For example, when a several hundred to several thousand extrusion ratio is employed (e.g., when producing a multiport tube), the alloy exhibits significantly inferior extrudability as compared with a pure Al material. An alloy that requires a high extrusion ram pressure or has a low critical extrusion rate (i.e., the maximum extrusion rate obtained without causing breakage of the partition of the hollow area of the multiport tube) exhibits inferior extrudability. An alloy containing Mn and Si at a high concentration requires a high ram pressure as compared with a pure Al material, so that the die tends to break or wear. Moreover, productivity decreases due to a decrease in the limiting extrusion rate.

A technique has been proposed that adds Si and Mn in order to increase strength, and performs a high-temperature homogenization treatment and a low-temperature homogenization treatment in combination in order to improve extrudability to reduce the amount of solute elements dissolved in the matrix, and reduce the deformation resistance. In this case, since a large amount of solute elements are added, an improvement in extrudability (particularly an improvement in extrusion rate) is limited although an increase in strength may be achieved. Specifically, it is difficult to achieve high strength and high extrudability (i.e., productivity) at the same time.

A refrigerant leaks from a refrigerant tube (extruded tube) of an automotive heat exchanger when perforation corrosion has occurred during use. Therefore, Zn is caused to adhere to the surface of an extruded tube by thermal spraying or the like, and is diffused by brazing. A Zn diffusion layer formed in the surface area of the tube serves as a sacrificial anode for the deeper area, and suppresses corrosion in the thickness direction (i.e., increases the perforation life). In this case, the Zn application step (e.g., Zn thermal spraying) is required after extruding the tube. Moreover, a step that applies a fluoride flux required for brazing, or a step that applies a flux to the entire heat exchanger core must be performed after the Zn application step. This increases the production cost. Since a filler metal is not applied to the tube, it is necessary to use a brazing fin that is clad with a filler metal as the fin material. This also increases the production cost as compared with the case of using a bare fin material that is not clad with a filler metal.

A technique that applies a mixture of a filler metal powder and a Zn-containing flux powder to the surface of an aluminum alloy extruded refrigerant tube has been proposed in order to solve the above problems. In this case, since the filler metal, Zn, and the flux can be simultaneously applied by a single step, the production cost can be reduced. Moreover, since a bare fin material can be used as the fin material, the production cost can be further reduced. According to this technique, however, since the Zn concentration in the fin joint fillet increases due to the Zn-containing flux, preferential corrosion of the fillet occurs during use, so that the fin is separated at an early stage. The functions of the heat exchanger are impaired by separation of the fin. Moreover, since the sacrificial anode effect of the fin (that is obtained when the potential of the fin is lower than that of the tube) cannot be obtained, corrosion perforation of the tube occurs at an early stage. When the amount of the Zn-containing flux is reduced in order to prevent the above phenomenon, the amount of flux necessary for brazing becomes insufficient, so that defective brazing occurs.

As a technique that ensures brazability by maintaining the total amount of flux, a technique that applies a mixture of a filler metal powder, a Zn-containing flux powder, and a Zn-free flux powder to the surface of an aluminum alloy extruded refrigerant tube has been proposed. However, this technique mainly aims to improve brazability, and does not specify the alloy components of the extruded alloy tube that affect corrosion resistance (the alloy components are not described even in the examples). Therefore, the effect of this technique on corrosion resistance is unclear. Moreover, since the ratio of the amount of the Zn-containing flux to the amount of the Zn-free flux is too large, the Zn concentration in the fillet increases, and preferential corrosion of the fillet occurs, so that the fin is separated at an early stage.

A technique that that applies a mixture of a filler metal powder and a Zn-free flux powder to the surface of an aluminum alloy extruded refrigerant tube has been proposed in order to suppress an increase in Zn concentration in the fillet, and prevent a situation in which the fin is separated at an early stage due to preferential corrosion of the fillet. This technique causes the potential of the fin to be lower than that of the tube, and protects the tube against corrosion by utilizing the sacrificial anode effect of the fin. According to this technique, the Zn concentration in the fillet can be reduced, and a situation in which the fin is separated at an early stage due to preferential corrosion of the fillet can be prevented. However, since a sacrificial anode layer due to diffusion of Zn is not present in the tube, it is impossible to sufficiently protect the tube against corrosion in an area in which the fin is not present, or an area that is situated away from the fin (e.g., an area near the header).

In particular, when using a technique that limits the amount of Si in the tube, that causes Al—Mn—Si compounds to precipitate in the surface area of the tube due to diffusion of Si from the applied Si powder (i.e., forms an area having a low degree of Mn solid dissolution (i.e., an area having a potential lower than that of a deeper area) in the surface area of the tube), and that protects the tube against corrosion utilizing the above area as the sacrificial anode layer, the potential difference between the surface area and the deep area of the tube is small, and corrosion cannot be sufficiently prevented in a dry-wet environment.

JP-A-2005-256166, JP-A-2004-330233, JP-A-2006-255755, JP-A-2009-58139, and JP-A-2009-58167 disclose related-art technologies.

SUMMARY OF THE INVENTION

The invention was conceived in order to solve the above technical problems relating to aluminum heat exchangers (particularly automotive heat exchangers). An object of the invention is to provide a method for producing an aluminum alloy heat exchanger that is characterized by a material configuration that improves the strength, extrudability, and corrosion resistance of a refrigerant tube, and implements an improvement in productivity and a reduction in cost.

According to one aspect of the invention, a method for producing an aluminum alloy heat exchanger includes applying a coating material prepared by mixing an Si powder, a flux powder, and a binder to a surface of a multiport flat refrigerant tube, assembling an aluminum alloy bare fin with the multiport flat refrigerant tube, and brazing the multiport flat refrigerant tube and the aluminum alloy bare fin to obtain an aluminum alloy heat exchanger, the multiport flat refrigerant tube being formed of an aluminum alloy extruded material that includes 0.5 to 1.7 mass % of Mn, less than 0.10 mass % of Si, and less than 0.10 mass % of Cu, with the balance being Al and unavoidable impurities, the aluminum alloy bare fin being a corrugated fin that is obtained by forming an Al—Mn—Zn alloy material, the coating material being prepared by mixing an Si powder, a Zn-containing compound flux powder, a Zn-free compound flux powder, and a binder, the Si powder being applied in an amount of 1 to 4 g/m$^2$, the Zn-containing compound flux powder being applied in an amount of 1 to 9 g/m$^2$, the Zn-free compound flux powder being applied in an amount of 1 to 9 g/m$^2$, the Si powder, the Zn-containing compound flux powder, and the Zn-free compound flux powder being applied in an amount of 5 to 20 g/m$^2$ in total, a content of the binder in the coating material being 5 to 40%, and the aluminum alloy heat exchanger obtained by brazing having a configuration in which a deep area of the refrigerant tube has the highest potential, and the potential decreases in order from a surface area of the refrigerant tube, a fin joint fillet, and the fin. Note that the unit "mass %" of each alloy component may be hereinafter referred to as "%".

In the method for producing an aluminum alloy heat exchanger, the aluminum alloy extruded material that forms the refrigerant tube may further include one or more elements among 0.30 mass % or less of Ti, 0.10 mass % or less of Sr, and 0.30 mass % or less of Zr.

In the method for producing an aluminum alloy heat exchanger, the Si powder may have a maximum particle size of 35 μm or less.

In the method for producing an aluminum alloy heat exchanger, the Zn-containing compound flux powder may be KZnF$_3$.

In the method for producing an aluminum alloy heat exchanger, the Zn-free compound flux powder may be a potassium fluoroaluminate.

In the method for producing an aluminum alloy heat exchanger, the aluminum alloy bare fin may be formed of an aluminum alloy that includes 0.1 to 1.8 mass % of Mn and 0.8 to 3.0 mass % of Zn, with the balance being Al and unavoidable impurities.

In the method for producing an aluminum alloy heat exchanger, the aluminum alloy bare fin may be formed of an aluminum alloy that includes 0.1 to 1.8 mass % of Mn, 0.8 to 3.0 mass % of Zn, and one or more elements among 0.1 to 1.2 mass % of Si, 0.01 to 0.8 mass % of Fe, 0.05 to 0.5 mass % of Mg, 0.3 mass % or less of Cu, 0.3 mass % or less of Cr, 0.3 mass % or less of Zr, and 0.3 mass % or less of Ti, with the balance being Al and unavoidable impurities.

In the method for producing an aluminum alloy heat exchanger, the aluminum alloy that forms the aluminum alloy bare fin may further include one or more elements among 0.001 to 0.10 mass % of In and 0.001 to 0.10 mass % of Sn.

In the method for producing an aluminum alloy heat exchanger, the aluminum alloy excluded material that forms the refrigerant tube may be obtained by casting an ingot, subjecting the ingot to a homogenization heat treatment that holds the ingot at 400 to 650° C. for 4 hours or more, and hot-extruding the ingot.

In the method for producing an aluminum alloy heat exchanger, the aluminum alloy excluded material that forms the refrigerant tube may be obtained by casting an ingot, subjecting the ingot to a homogenization heat treatment, and hot-extruding the ingot, the homogenization heat treatment including a first-stage heat treatment that holds the ingot at 550 to 650° C. for 2 hours or more, and a second-stage heat treatment that cools the ingot subjected to the first-stage heat treatment to 400 to 550° C., and holds the ingot at 400 to 550° C. for 3 hours or more.

In the method for producing an aluminum alloy heat exchanger, the aluminum alloy excluded material that forms the refrigerant tube may be obtained by casting an ingot, subjecting the ingot to a homogenization heat treatment, and hot-extruding the ingot, the homogenization heat treatment including a first-stage heat treatment that holds the ingot at 550 to 650° C. for 2 hours or more, and a second-stage heat treatment that cools the ingot subjected to the first-stage heat treatment to 200° C. or less, and holds the ingot at 400 to 550° C. for 3 hours or more.

The invention may thus provide a method for producing an aluminum alloy heat exchanger (particularly an automotive heat exchanger) that is characterized by a material configuration that improves the strength, extrudability, and corrosion resistance of a refrigerant tube, and implements an improvement in productivity and a reduction in cost.

DESCRIPTION OF EXEMPLARY EMBODIMENTS

The alloy composition of an aluminum alloy extruded material that forms a refrigerant tube used for a method for producing an aluminum alloy heat exchanger according to one embodiment of the invention, and a method for producing the aluminum alloy extruded material are described below.

Mn

The aluminum alloy extruded material that forms the refrigerant tube includes 0.5 to 1.7% of Mn. Mn is dissolved in the matrix when brazing an automotive heat exchanger by heating, and achieves an increase in strength as compared with a pure aluminum alloy that has been used to form a multiport extruded tube for automotive heat exchangers. If the Mn content is less than 0.5%, the strength-improving effect may be insufficient. If the Mn content exceeds 1.7%, extrudability may decrease. The Mn content is preferably 0.6 to 1.5%.

The addition of Mn decreases extrudability (particularly the critical extrusion rate) to only a small extent as compared with the case where the same amount of Si, Cu, or Mg is added. When adding an identical amount of Mn, Si, Cu, or Mg so that an identical strength is obtained, a decrease in critical extrusion rate is a minimum, and high strength and high extrudability (i.e., productivity) can be achieved in combination when adding Mn.

Si

The Si content is limited to less than 0.10%. Si has the following effects. An Si powder applied to the surface of the refrigerant tube diffuses into the refrigerant tube during heating for brazing, forms an Al—Mn—Si intermetallic compound with Mn included in the aluminum alloy that forms the refrigerant tube, and precipitates. Therefore, the solid solubility of Mn and Si in the Si diffusion layer in the aluminum alloy that forms the refrigerant tube decreases, so that the potential of the Si diffusion layer becomes lower than that of the area deeper than the Si diffusion layer (i.e., an area in which Si is not diffused). The surface area up to the depth of the Si diffusion layer functions as a sacrificial anode layer for the deeper area, so that the corrosion perforation life in the depth direction can be improved.

If the Si content is 0.10% or more, since an Al—Mn—Si intermetallic compound is initially present in the alloy, the solid solubility of Mn in the alloy decreases. In this case, even if the Si powder applied to the surface diffuses into the alloy during heating for brazing, precipitation of Al—Mn—Si intermetallic compounds does not sufficiently occur, so that a decrease in potential does not occur in the surface area up to the depth of the Si diffusion layer. Therefore, the surface area up to the depth of the Si diffusion layer does not serve as a sacrificial anode layer (i.e., the corrosion perforation life is not improved). It is preferable to limit the Si content to less than 0.05%. Note that the sacrificial anode layer obtained as described above may not sufficiently prevent corrosion depending on the environment. However, since a Zn-containing flux is also applied in the method for producing an aluminum alloy heat exchanger according to one embodiment of the invention, the potential-decreasing effect of the Zn-containing flux achieves a synergistic effect, so that corrosion can be more effectively prevented.

Cu

The Cu content is limited to less than 0.10%. Cu has the following effects. Since the addition of Cu significantly decreases extrudability as compared with Mn, it is necessary to limit the Cu content taking account of a decrease in extrudability. It is known that the potential decreases due to the addition of Zn, and increases due to the addition of Cu. The inventors found that the potential-increasing effect of Cu predominantly occurs when Zn coexists with Cu (particularly when the Zn content is low). In the method for producing an aluminum alloy heat exchanger according to one embodiment of the invention, a Zn diffusion layer formed during brazing due to the Zn-containing flux powder has a low surface Zn concentration as compared with a Zn diffusion layer formed during brazing due to Zn thermal spraying or the like. In the method for producing an aluminum alloy heat exchanger according to one embodiment of the invention, since a Zn-free flux is also used, the surface Zn concentration further decreases. Therefore, if the refrigerant tube contains 0.10% or more of Cu, the potential-decreasing effect of the Zn diffusion layer formed due to the Zn-containing flux is counterbalanced by the potential-increasing effect of Cu. In this case, the potential of the surface area of the refrigerant tube does not decrease in spite of the presence of the Zn diffusion layer, so that a potential gradient cannot be formed such that the surface area has a lower potential and the deep area has a higher potential in the thickness direction of the refrigerant tube. As a result, it is impossible to improve the perforation life by allowing the surface area of the refrigerant tube to function as a sacrificial anode and prevent corrosion of the deep area. Moreover, an Si diffusion layer is present in the surface area of the refrigerant tube due to the applied Si powder, and increases the potential of the surface area.

When the Cu content is high, the potential-increasing effect of Cu becomes completely predominant over the potential-decreasing effect of the Zn diffusion layer, so that a potential gradient is formed such that the surface area has a higher potential and the deep area has a lower potential in the thickness direction of the refrigerant tube along with the potential-increasing effect of the Si diffusion layer. In this case, since the deep area serves as an anode with respect to the surface area of the refrigerant tube, perforation corrosion occurs at an early stage. The surface Zn concentration may be increased by increasing the amount of the Zn-containing flux powder. In this case, however, the thickness of the film decreases during brazing due to melting of Si and the flux, so that the distance between the refrigerant tube and the fin material decreases. Since the above phenomenon occurs over the entire core, the outer dimensions of the core decrease. Moreover, since the Zn concentration in the fin joint fillet also increases, the fin may be separated at an early stage due to preferential corrosion of the fillet.

When the Cu content is limited to less than 0.10%, the potential of the surface area of the refrigerant tube decreases due to the low-concentration Zn diffusion layer. Therefore, a potential distribution in the thickness direction can be formed so that the surface area has a lower potential and the deep area has a higher potential such that the deep area is protected against corrosion by utilizing the surface area of the refrigerant tube as a sacrificial anode. It is preferable to limit the Cu content to less than 0.05%, and more preferably less than 0.03%.

Ti, Sr, and Zr

The aluminum alloy extruded material that forms the refrigerant tube may include one or more elements among 0.30% or less of Ti, 0.10% or less of Sr, and 0.30% or less of Zr.

Ti forms a high-Ti-concentration area and a low-Ti-concentration area in the refrigerant tube. These areas are alternately distributed in layers in the thickness direction. Since the low-Ti-concentration area is preferentially corroded as compared with the high-Ti-concentration area, corrosion occurs in a layered manner. Therefore, corrosion does not proceed in the thickness direction. As a result, pitting corrosion resistance and intergranular corrosion resistance are improved. Moreover, the strength of the material at room temperature and a high temperature is improved by adding Ti. If the Ti content exceeds 0.30%, coarse crystallized products may be produced during casting. This may make it difficult to produce a sound refrigerant tube.

Sr causes the Si powder applied to the surface of the refrigerant tube to react with Al in the matrix during heating for brazing to produce an Al—Si alloy liquid filler metal, and causes the crystallized eutectic structure to be refined and dispersed during solidification due to cooling. Therefore, since the eutectic structure that serves as an anode site on the surface of the material is dispersed, corrosion is uniformly dispersed, so that a planar corrosion configuration is obtained. This improves corrosion resistance. If the Sr content exceeds 0.10%, an Al—Si—Sr compound may be crystallized, so that the eutectic structure may not be refined.

Zr increases the size of recrystallized grains, and decreases the grain boundary density of the matrix when the alloy that forms the refrigerant tube recrystallizes during heating for brazing. This suppresses a phenomenon in which the Al—Si alloy liquid filler metal produced by the Si powder applied to the surface of the refrigerant tube penetrates the grain boundaries of the matrix, and suppresses preferential intergranular corrosion. If the Zr content exceeds 0.30%, coarse crystallized products may be produced during casting. This may make it difficult to produce a sound refrigerant tube. The effects of Ti, Sr, and Zr can be obtained in combination when Ti, Sr, and Zr are added in combination.

Production Step (1)

In a production step (1), an ingot of an aluminum alloy extruded material that forms the refrigerant tube and has the above composition is subjected to a homogenization treatment at 400 to 650° C. for 4 hours or more, and then hot-extruded. The homogenization treatment causes coarse crystallized products formed during casting and solidification to be decomposed or granulated, so that a non-uniform texture (e.g., segregation layer) produced during casting can be homogenized. When coarse crystallized products or a non-uniform texture (e.g., segregation layer) produced during casting remain during hot extrusion, extrudability may decrease, or the surface roughness of the extruded product may decrease. If the homogenization temperature is less than 400° C., the reaction may proceed to only a small extent. The reaction easily proceeds as the homogenization temperature increases. However, melting may occur if the homogenization temperature is more than 650° C. The homogenization temperature is preferably 430 to 620° C. Since the reaction easily proceeds as the homogenization time increases, it is preferable to perform the homogenization treatment for 10 hours or more. The effect of the homogenization treatment may be saturated (i.e., it may be uneconomical) even if the homogenization treatment is performed for more than 24 hours. Therefore, the homogenization treatment time is preferably 10 to 24 hours.

Production Step (2)

In a production step (2), a high-temperature homogenization treatment and a low-temperature homogenization treatment are performed in combination. More specifically, the ingot is subjected to a homogenization heat treatment, and then hot-extruded, the homogenization heat treatment including a first-stage heat treatment that holds the ingot at 550 to 650° C. for 2 hours or more, and a second-stage heat treatment that cools the ingot subjected to the first-stage heat treatment to 400 to 550° C., and holds the ingot at 400 to 550° C. for 3 hours or more. This further improves hot-extrudability, and reduces occurrence of aluminum refuse during hot extrusion. The term "aluminum refuse" used herein refers to a defect wherein aluminum pieces accumulated in the die during extrusion are discharged from the die when a given size is reached, and adhere to the surface of the extruded refrigerant tube. The high-temperature first-stage heat treatment holds the ingot at 550 to 650° C. for 2 hours or more. The high-temperature first-stage heat treatment causes coarse crystallized products formed during casting and solidification to be decomposed, granulated, or redissolved. If the homogenization temperature is less than 550° C., redissolution may proceed to only a small extent. The reaction easily proceeds as the homogenization temperature increases. However, melting may occur if the homogenization temperature is more than 650° C. The homogenization temperature is preferably 580 to 620° C. Since the reaction easily proceeds as the first-stage heat treatment time increases, it is preferable to perform the first-stage heat treatment for 5 hours or more. The effect of the first-stage heat treatment may be saturated (i.e., it may be uneconomical) even if the first-stage heat treatment is performed for more than 24 hours. Therefore, the first-stage heat treatment time is preferably 5 to 24 hours.

When the second-stage heat treatment that cools the ingot to 400 to 550° C., and holds the ingot at 400 to 550° C. for 3 hours or more is performed after the high-temperature first-stage heat treatment, Mn dissolved in the matrix precipitates, so that the solid solubility of Mn decreases. This reduces deformation resistance during the subsequent hot extrusion, so that extrudability can be improved. If the second-stage heat treatment temperature is less than 400° C., precipitation may not sufficiently occur, so that the effect of reducing the deformation resistance may be insufficient. If the second-stage heat treatment temperature exceeds 550° C., precipitation may not sufficiently occur, so that the effect of reducing the deformation resistance may be insufficient. If the treatment time is less than 3 hours, precipitation may not sufficiently occur, so that the effect of reducing the deformation resistance may be insufficient. The reaction easily proceeds as the treatment time increases. However, the effect of the treatment may be saturated (i.e., it may be uneconomical) even if the treatment is performed for more than 24 hours. The second-stage heat treatment is preferably performed for 5 to 15 hours.

Production Step (3)

The above two-stage homogenization treatment is designed so that Mn that has been sufficiently and homogeneously dissolved by the first-stage heat treatment is precipitated by the second-stage heat treatment that is performed at the above specific temperature. The first-stage heat treatment and the second-stage heat treatment need not necessarily be performed consecutively. Specifically, the second-stage heat treatment may be performed continuously with the first-stage heat treatment, or the ingot may be subjected to a homogenization heat treatment, and then hot-extruded as a production step (3), the homogenization heat treatment including a first-stage heat treatment that holds the ingot at 550 to 650° C. for 2 hours or more, and a second-stage heat treatment that cools the ingot subjected to the first-stage heat treatment to 200° C. or less, and holds the ingot at 400 to 550° C. for 3 hours or more.

A coating material prepared by mixing an Si powder, a flux powder, and a binder is described below. A Zn-containing compound flux powder and a Zn-free compound flux powder are used as the flux.

In the method for producing an aluminum alloy heat exchanger according to one embodiment of the invention, a mixture of the Si powder, the Zn-containing compound flux powder, the Zn-free compound flux powder, and the binder is applied to the surface of the refrigerant tube extruded material for the following reasons. The Si powder reacts with Al in the matrix of the refrigerant tube during brazing to produce an Al—Si liquid filler metal, and makes it possible to bond a fin material or a header material to the refrigerant tube. The Zn-containing flux is decomposed into the flux and Zn during brazing. The flux removes an oxide film from the surface of the aluminum alloy to enable brazing, while Zn diffuses into the refrigerant tube to form a Zn diffusion layer. A potential gradient can thus be formed so that the surface area of the refrigerant tube has a lower potential and the deep area of the refrigerant tube has a higher potential. Therefore, the deep area can be protected against corrosion by utilizing the surface area as a sacrificial anode.

When using only the Zn-containing flux, the Zn concentration in the fin joint fillet also increases, so that the fin may be separated at an early stage due to preferential corrosion of the fillet. Therefore, the method for producing an aluminum alloy heat exchanger according to one embodiment of the invention necessarily uses the Zn-free flux in order to appropriately decrease the Zn ratio in the mixed powder so that the refrigerant tube exhibits corrosion resistance, and preferential corrosion of the fillet is suppressed. The Zn-free flux powder also enables brazing in the same manner as the flux that is obtained due to decomposition of the Zn-containing flux during brazing. In particular, the amount of the flux that is obtained due to decomposition of the Zn-containing flux during brazing may be insufficient for enabling brazing when the brazing atmosphere is poor (e.g., when the oxygen concentration in the furnace is high). The binder improves adhesion when causing the mixed powder to adhere to the refrigerant tube.

It is preferable that the maximum particle size of the Si powder be 35 μm or less. The fluidity of the Al—Si liquid filler metal produced during heating for brazing is improved, and erosion of the matrix is suppressed when the Si powder has such a small particle size. It is more preferable that the maximum particle size of the Si powder be 15 μm or less. The average particle size of the Zn-containing compound flux powder and the Zn-free compound flux powder is about 5 μm. $KZnF_3$ is used as the Zn-containing compound flux powder, for example. A potassium fluoroaluminate (e.g., $KAlF_4$, $K_2AlF_5$, or $K_3AlF_6$) is used as the Zn-free compound flux powder, for example. An acrylic resin is used as the binder, for example.

In the method for producing an aluminum alloy heat exchanger according to one embodiment of the invention, a mixture of the Si powder, the Zn-containing compound flux powder, and the Zn-free compound flux powder is used. The Si powder is applied in an amount of 1 to 4 g/m². If the amount of the Si powder is less than 1 g/m², a sufficient liquid filler metal may not be obtained during brazing, so that sufficient bonding may not be achieved. If the amount of the Si powder exceeds 4 g/m², since the ratio of the Zn-containing flux powder and the Zn-free flux powder to the mixed powder decreases, the amount of Zn that diffuses into the refrigerant tube may be insufficient. Moreover, brazability may deteriorate due to a decrease in the amount of flux. The Si powder is preferably applied in an amount of 2 to 4 g/m².

The Zn-containing flux powder is applied in an amount of 1 to 9 g/m². If the amount of the Zn-containing flux powder is less than 1 g/m², the amount of Zn that diffuses into the refrigerant tube may be insufficient, and corrosion resistance may decrease since the potential of the surface area of the refrigerant tube may not be sufficiently lower than that of the deep area. Moreover, brazability may deteriorate due to a decrease in the amount of flux. If the amount of the Zn-containing flux powder exceeds 9 g/m², the amount of Zn that diffuses into the refrigerant tube may be sufficient, and the potential of the surface area of the refrigerant tube may be sufficiently lower than that of the deep area. However, since the Zn concentration in the fin joint fillet also increases, the fin may be separated at an early stage due to preferential corrosion of the fillet. The Zn-containing flux powder is preferably applied in an amount of 3 to 7.5 g/m².

In the method for producing an aluminum alloy heat exchanger according to one embodiment of the invention, the Zn-free flux powder is necessarily used in order to ensure that the refrigerant tube exhibits corrosion resistance, and suppress preferential corrosion of the fillet due to an increase in Zn concentration. The Zn-free flux powder is applied in an amount of 1 to 9 g/m². If the amount of the Zn-free flux powder is less than 1 g/m², since the ratio of the Zn-containing flux powder in the mixed powder increases, preferential corrosion of the fillet may occur due to an increase in Zn concentration. Moreover, brazability may deteriorate due to a decrease in the total amount of flux. If the amount of the Zn-free flux powder exceeds 9 g/m², since the ratio of the Zn-containing flux powder in the mixed powder decreases, the amount of Zn that diffuses into the refrigerant tube may be insufficient, so that the corrosion resistance of the refrigerant tube may decrease. The Zn-free flux powder is preferably applied in an amount of 1.5 to 6 g/m².

The content of the binder in the coating material is preferably 5 to 40 wt %. If the content of the binder in the coating material is less than 5 wt %, the mixture may be easily removed. If the content of the binder in the coating material exceeds 40 wt %, brazability may decrease. The Si powder, the Zn-containing compound flux powder, and the Zn-free compound flux powder are used in an amount of 5 to 20 g/m² in total. If the amount of the mixture is less than 5 g/m², the amount of Zn that adheres to the surface of the refrigerant tube may be insufficient. If the amount of the mixture exceeds 20 g/m², the amount of filler metal produced may increase, so that melting or dissolution of the fin or the matrix may occur. Moreover, since the thickness of the film between the refrigerant tube and the fin material increases, the dimensions of the entire core may decrease if the film decreases in thickness due to melting during heating for brazing. The coating material may be applied to the refrigerant tube by roll coating.

The relationship among the potentials of the deep area and the surface area of the refrigerant tube, the potential of the fin joint fillet, and the potential of the fin included in the heat exchanger produced by the method for producing an aluminum alloy heat exchanger according to one embodiment of the invention is described below. The heat exchanger produced by the method for producing an aluminum alloy heat exchanger according to one embodiment of the invention is characterized in that the deep area of the refrigerant tube has the highest potential, and the potential decreases in order from the surface area of the refrigerant tube, the fin joint fillet, and the fin. The deep area of the refrigerant tube refers to an area that is not affected by diffusion of Zn from the surface. Therefore, the surface area of the refrigerant tube serves as a sacrificial anode for the deep area, so that the deep area can be cathodically protected. The fin serves as a sacrificial anode for the surface area and the deep area of the refrigerant tube, so that the refrigerant tube can be protected against corrosion. Since the potential of the fin joint fillet is higher than that of the fin, preferential corrosion of the fillet can be suppressed, so that separation of the fin at an early stage can be prevented.

When producing a heat exchanger using the refrigerant tube according to one embodiment of the invention, defective brazing that may occur at the joint between the refrigerant tube and a header material can also be suppressed for the following reasons. Specifically, the refrigerant tube and the header material are mainly bonded via a filler metal applied to the header material. However, the Si powder adheres to the surface of the refrigerant tube, and the surface of the refrigerant tube is covered with a liquid filler metal during brazing.

Therefore, the filler metal applied to the header material communicates with the liquid filler metal on the surface of the refrigerant tube (i.e., flows freely). The refrigerant tube is bonded to the fin on the side opposite to the header, and the filler metal applied to the header material moves along the surface of the refrigerant tube, and reaches the joint with the fin due to surface tension. Therefore, the amount of filler metal becomes insufficient at the joint between the header and the refrigerant tube, so that defective brazing occurs. In particular, defective brazing occurs when using a refrigerant tube formed of a pure aluminum alloy or an alloy produced by adding Cu to a pure aluminum alloy. In contrast, when forming the refrigerant tube using the aluminum alloy according to one embodiment of the invention, defective brazing does not occur at the joint between the refrigerant tube and the header material even when the header material is provided with the same amount of filler metal as in the case of using the refrigerant tube formed of the above alloy. Specifically, since an Al—Mn precipitate (resistance) is present on the surface of the refrigerant tube alloy according to one embodiment of the invention, the wettability of the liquid filler metal with the surface of the alloy can be suppressed as compared with a pure aluminum alloy or an alloy produced by adding Cu to a pure aluminum alloy. This makes it possible to prevent a situation in which the filler metal applied to the header material moves along the surface of the refrigerant tube and flows into the joint with the fin.

The composition of an aluminum alloy bare fin material used for the method according to one embodiment of the invention is described below.

Mn

Mn improves the strength of the fin material. The Mn content is preferably 0.1 to 1.8%. If the Mn content is less than 0.1%, the effect may be insufficient. If the Mn content exceeds 1.8%, coarse crystallized products may be produced during casting. This may make it difficult to produce a sound fin material. The Mn content is more preferably 0.8 to 1.7%.

Zn

Zn decreases the potential of the fin material. The Zn content is preferably 0.8 to 3.0%. If the Zn content is less than 0.8%, a sufficient potential-decreasing effect may not be obtained. Moreover, the potential of the fin material may become higher than that of the fin joint fillet, and the fillet may undergo preferential corrosion, so that the separation resistance of the fillet may decrease. When the potential of the fin material is higher than that of the refrigerant tube, the fin material functions as a cathode for the refrigerant tube, so that the corrosion resistance of the refrigerant tube may decrease. If the Zn content exceeds 3.0%, the potential of the fin material sufficiently decrease, but the self-corrosion resistance of the fin material may decrease. Moreover, since the potential difference between the fin material and the fin joint fillet or the refrigerant tube increases, the fin material (anode) may be consumed at an early stage due to corrosion in an environment in which the material is always exposed to a high-conductivity liquid. The Zn content is more preferably 1.0 to 2.5%.

Si, Fe, Cu, Mg, Cr, Zr, Ti, In, and Sn

Si improves the strength of the fin material. The Si content is preferably 0.1 to 1.2%. If the Si content is less than 0.1%, the effect may be insufficient. If the Si content exceeds 1.2%, the melting point of the fin material may decrease, so that local melting may occur during heating for brazing. The Si content is more preferably 0.2 to 0.6%.

Fe improves the strength of the fin material. The Fe content is preferably 0.01 to 0.8%. If the Fe content is less than 0.01%, the effect may be insufficient. If the Fe content exceeds 0.8%, the amount of Al—Fe compounds produced may increase, so that the self-corrosion resistance of the fin material may decrease. The Fe content is more preferably 0.1 to 0.7%.

Mg improves the strength of the fin material. The Mg content is preferably 0.05 to 0.5%. If the Mg content is less than 0.05%, the effect may be insufficient. If the Mg content exceeds 0.5%, Mg reacts with a fluoride flux to produce magnesium fluoride during brazing in an inert gas atmosphere using a fluoride flux. As a result, brazability may decrease, and the appearance of the brazed area may deteriorate. The Mg content is more preferably 0.05 to 0.3%, and still more preferably 0.05 to 0.15%.

Cu improves the strength of the fin material. The Cu content is preferably 0.3% or less. If the Cu content exceeds 0.3%, the potential of the fin material may increase, so that the corrosion resistance and the separation resistance of the refrigerant tube may be impaired. Moreover, the self-corrosion resistance of the fin material may decrease. Cr and Zr increase the crystal grain size after brazing, and reduce buckling of the fin material during heating for brazing. The Cr content and the Zr content are preferably 0.3% or less. If the Cr content and/or the Zr content exceeds 0.3%, coarse crystallized products may be produced during casting. This may make it difficult to produce a sound fin material.

Ti forms a high-Ti-concentration area and a low-Ti-concentration area in the alloy. These areas are alternately distributed in layers in the direction of the thickness of the material. Since the low-Ti-concentration area is preferentially corroded as compared with the high-Ti-concentration area, corrosion occurs in a layered manner. Therefore, corrosion does not proceed in the direction of the thickness of the material. As a result, pitting corrosion resistance and intergranular corrosion resistance are improved. Moreover, the strength of the material at room temperature and a high temperature is improved by adding Ti. The Ti content is preferably 0.3% or less. If the Ti content exceeds 0.3%, coarse crystallized products may be produced during casting. This may make it difficult to produce a sound fin material.

In and Sn decrease the potential of the fin material with a small amount of addition, and achieve the same effects as those achieved by adding Zn. The In content and the Sn content are preferably 0.001 to 0.10%. If the In content and/or the Sn content is less than 0.001%, the effect may be insufficient. If the In content and/or the Sn content exceeds 0.10%, the self-corrosion resistance of the fin material may decrease.

The aluminum alloy heat exchanger according to one embodiment of the invention may be produced by assembling the refrigerant tube and the fin material having the above composition, and brazing the refrigerant tube and the fin material by a normal method. The method for producing the aluminum alloy heat exchanger according to one embodiment of the invention is not particularly limited. The heating method, the structure of the heating furnace, and the like used when subjecting the refrigerant tube alloy to the homogenization treatment are not particularly limited. The shape of the refrigerant tube produced by extrusion is not particularly limited. The shape of the refrigerant tube is selected depending on the application (e.g., the shape of the heat exchanger). Since the aluminum alloy material for forming the refrigerant tube has excellent extrudability, the aluminum alloy material may be extruded using a multi-cavity die having a hollow shape. The atmosphere, the heating temperature, the heating time, and the brazing method when brazing the refrigerant tube and the fin material are not particularly limited. An aluminum alloy heat exchanger can thus be produced that exhibits excellent corrosion resistance, and exhibits excellent durability even when installed in an automobile that is subjected to a severe corrosive environment, for example.

EXAMPLES

The invention is further described below by way of examples and comparative examples to demonstrate the advantageous effects of the invention. Note that the following examples are provided for illustration purposes only, and the invention is not limited to the following examples.

Example 1

Aluminum alloys A to K (aluminum alloys for producing a refrigerant tube) having the composition shown in Table 1 were cast into billets, and the resulting billets were subjected to the following tests 1, 2, and 3.

Comparative Example 1

Aluminum alloys L to T (aluminum alloys for producing a refrigerant tube) having the composition shown in Table 2 were cast into billets, and the resulting billets were subjected to the following tests 1, 2, and 3. The alloy T has been widely used as an aluminum alloy for producing a refrigerant tube.

Test 1

The billet was homogenized at 600° C. for 10 hours, and hot-extruded to obtain a multiport tube. The critical extrusion rate ratio (i.e., the relative ratio with respect to the critical extrusion rate of the alloy T) during extrusion was determined. The results are shown in Tables 3 and 4. A case where the critical extrusion rate ratio was more than 1.0 was evaluated as "Acceptable", and a case where the critical extrusion rate ratio was less than 1.0 was evaluated as "Unacceptable" (extrudability evaluation).

Test 2

The multiport tube that was hot-extruded in Test 1 was subjected to heating for brazing. Specifically, the multiport tube was heated to 600° C. in a nitrogen gas atmosphere at an average temperature increase rate of 50° C./min, held for 3 minutes, and cooled to room temperature. The multiport tube was then subjected to a tensile test at room temperature. The results are shown in Tables 3 and 4. A case where the tensile strength was higher than that of the alloy T was evaluated as "Acceptable", and a case where the tensile strength was lower than that of the alloy T was evaluated as "Unacceptable" (evaluation of strength after brazing).

Test 3

The billet obtained by casting the alloy C (inventive alloy) was homogenized under the conditions shown in Tables 5 and 6, and hot-extruded to obtain a multiport tube, and the critical extrusion rate ratio (i.e., the relative ratio with respect to the critical extrusion rate of the alloy T) was determined. The temperature increase rate until the first-stage homogenization temperature was reached was set to 50° C./h. The temperature decrease rate when successively performing the first-stage homogenization treatment and the second-stage homogenization treatment was set to 25° C./h. The billet was allowed to cool after the second-stage homogenization treatment. The results are shown in Tables 5 and 6. A case where the critical extrusion rate ratio was more than 1.0 was evaluated as "Acceptable", and a case where the critical extrusion rate ratio was less than 1.0 was evaluated as "Unacceptable" (extrudability evaluation).

TABLE 1

| No. | Composition (mass %) | | | | | | |
|-----|------|------|------|-----|------|------|------|
|     | Si   | Fe   | Cu   | Mn  | Ti   | Sr   | Zr   |
| A | 0.05 | 0.15 | 0    | 0.5 | 0    | 0    | 0    |
| B | 0.05 | 0.15 | 0    | 1.7 | 0    | 0    | 0    |
| C | 0.05 | 0.15 | 0    | 0.7 | 0    | 0    | 0    |
| D | 0.05 | 0.15 | 0    | 0.7 | 0.15 | 0    | 0    |
| E | 0.05 | 0.15 | 0    | 0.7 | 0    | 0.03 | 0    |
| F | 0.05 | 0.15 | 0    | 0.7 | 0    | 0    | 0.15 |
| G | 0.05 | 0.15 | 0    | 0.7 | 0.15 | 0.03 | 0    |
| H | 0.05 | 0.15 | 0    | 0.7 | 0    | 0.03 | 0.15 |
| I | 0.05 | 0.15 | 0    | 0.7 | 0.15 | 0    | 0.15 |
| J | 0.05 | 0.15 | 0    | 0.7 | 0.15 | 0.03 | 0.15 |
| K | 0.05 | 0.15 | 0.03 | 0.7 | 0    | 0    | 0    |

TABLE 2

| No. | Composition (mass %) | | | | | | |
|-----|------|------|------|------|------|------|------|
|     | Si   | Fe   | Cu   | Mn   | Ti   | Sr   | Zr   |
| L | 0.05 | 0.15 | 0    | 0.4  | 0    | 0    | 0    |
| M | 0.05 | 0.15 | 0    | 1.8  | 0    | 0    | 0    |
| N | 0.05 | 0.15 | 0    | 0.7  | 0.35 | 0    | 0    |
| O | 0.05 | 0.15 | 0    | 0.7  | 0    | 0.20 | 0    |
| P | 0.05 | 0.15 | 0    | 0.7  | 0    | 0    | 0.35 |
| Q | 0.15 | 0.15 | 0    | 0.7  | 0    | 0    | 0    |
| R | 0.05 | 0.15 | 0.15 | 0.7  | 0    | 0    | 0    |
| S | 0.05 | 0.15 | 0.01 | 0.01 | 0    | 0    | 0    |
| T | 0.05 | 0.15 | 0.4  | 0.1  | 0    | 0    | 0    |

TABLE 3

| No. | Critical extrusion rate ratio | Evaluation | Strength after brazing (MPa) | Evaluation |
|-----|------|------------|-----|------------|
| A | 1.41 | Acceptable | 75  | Acceptable |
| B | 1.00 | Acceptable | 115 | Acceptable |
| C | 1.33 | Acceptable | 80  | Acceptable |
| D | 1.29 | Acceptable | 83  | Acceptable |
| E | 1.29 | Acceptable | 80  | Acceptable |
| F | 1.29 | Acceptable | 80  | Acceptable |
| G | 1.15 | Acceptable | 84  | Acceptable |
| H | 1.15 | Acceptable | 81  | Acceptable |
| I | 1.15 | Acceptable | 84  | Acceptable |
| J | 1.10 | Acceptable | 84  | Acceptable |
| K | 1.30 | Acceptable | 82  | Acceptable |

TABLE 4

| No. | Critical extrusion rate ratio | Evaluation | Strength after brazing (MPa) | Evaluation |
|-----|------|--------------|-----|--------------|
| L | 1.42 | Acceptable   | 70  | Unacceptable |
| M | 0.9  | Unacceptable | 120 | Acceptable   |
| N | 0.95 | Unacceptable | 90  | Acceptable   |
| O | 0.95 | Unacceptable | 85  | Acceptable   |
| P | 0.95 | Unacceptable | 85  | Acceptable   |
| Q | 1.21 | Acceptable   | 81  | Acceptable   |
| R | 0.95 | Unacceptable | 87  | Acceptable   |
| S | 1.58 | Acceptable   | 60  | Unacceptable |
| T | 1.00 | —            | 75  | —            |

TABLE 5

| No. | First stage Temperature (° C.) | First stage Holding time (h) | Cooling to room temperature (two-stage treatment) | Second stage Temperature (° C.) | Second stage Holding time (h) | Critical extrusion rate ratio | Evaluation |
|---|---|---|---|---|---|---|---|
| C | 500 | 10 | — | — | — | 1.12 | Acceptable |
| C | 600 | 10 | — | — | — | 1.33 | Acceptable |
| C | 600 | 10 | No | 500 | 10 | 1.45 | Acceptable |
| C | 600 | 10 | Yes | 500 | 10 | 1.47 | Acceptable |

TABLE 6

| No. | First stage Temperature (° C.) | First stage Holding time (h) | Cooling to room temperature (two-stage treatment) | Second stage Temperature (° C.) | Second stage Holding time (h) | Critical extrusion rate ratio | Evaluation |
|---|---|---|---|---|---|---|---|
| C | 600 | 2 | — | — | — | 0.97 | Unacceptable |
| C | 380 | 10 | — | — | — | 0.92 | Unacceptable |
| C | 600 | 1 | No | 500 | 2 | 0.88 | Unacceptable |
| C | 530 | 10 | No | 450 | 10 | 0.93 | Unacceptable |
| T | 600 | 10 | — | — | — | 1.00 | — |

As shown in Tables 3 to 6, the inventive alloys A to K exhibited an excellent critical extrusion rate ratio and excellent strength as compared with the comparative alloys L to T. The billet obtained by casting the inventive alloy C and subjected to the homogenization treatment under the conditions that fall within the scope of the invention exhibited an excellent critical extrusion rate ratio and excellent strength as compared with the alloy T.

Example 2

Alloys a to 1 (alloys for producing a fin material) having the composition shown in Table 7 were cast into slabs. Each slab was homogenized, hot-rolled, and cold-rolled to obtain a fin material having a thickness of 0.1 mm. The fin material was then corrugated (fin pitch: 3 mm, fin height: 7 mm). A coating material was prepared by mixing a Si powder, a $KZnF_3$ powder, a Zn-free flux powder (Nocolok flux), and an acrylic resin binder (the mixing ratio is shown in Table 9). The coating material was applied to the surface of the refrigerant tube by roll coating. The refrigerant tube and the corrugated fin were assembled (see Table 9), and brazed to obtain a heat exchanger core (test material). The heat exchanger core (test material) production state is shown in Table 9. A case where the heat exchanger core was produced without any problem was evaluated as "Acceptable", and a case where a problem occurred when producing the heat exchanger core was evaluated as "Unacceptable". The refrigerant tube was homogenized at 600° C. for 10 hours. When brazing the refrigerant tube and the fin, the refrigerant tube and the fin were heated to 600° C. in a nitrogen gas atmosphere at an average temperature increase rate of 50° C./min, held for 3 minutes, and cooled to room temperature.

Comparative Example 2

Alloys m to x (alloys for producing a fin material) having the composition shown in Table 8 were cast into slabs. Each slab was homogenized, hot-rolled, and cold-rolled to obtain a fin material having a thickness of 0.1 mm. The fin material was then corrugated in the same manner as in Example 2. A coating material was prepared by mixing an Si powder, a $KZnF_3$ powder, a Zn-free flux powder (Nocolok flux), and an acrylic resin binder (the mixing ratio is shown in Table 10). The coating material was applied to the surface of the refrigerant tube by roll coating. The refrigerant tube and the corrugated fin were assembled (see Table 10), and brazed to obtain a heat exchanger core (test material). The heat exchanger core (test material) production state was evaluated in the same manner as in Example 2. The results are shown in Table 10. Note that the refrigerant tube was homogenized and brazed in the same manner as in Example 2.

TABLE 7

| | Composition (mass %) | | | | | |
|---|---|---|---|---|---|---|
| No. | Si | Fe | Cu | Mn | Zn | Other |
| a | 0.05 | 0.15 | 0 | 1.2 | 0.8 | |
| b | 0.05 | 0.15 | 0 | 1.2 | 3.0 | |
| c | 0.05 | 0.15 | 0 | 1.2 | 1.5 | |
| d | 0.05 | 0.15 | 0.15 | 1.2 | 2.5 | |
| e | 0.5 | 0.15 | 0 | 1.2 | 1.5 | |
| f | 0.5 | 0.15 | 0.15 | 1.2 | 2.5 | |
| g | 0.05 | 0.15 | 0 | 1.2 | 1.5 | Mg: 0.1 |
| h | 0.05 | 0.15 | 0 | 1.2 | 1.5 | Cr: 0.15 |
| i | 0.05 | 0.15 | 0 | 1.2 | 1.5 | Zr: 0.15 |
| j | 0.05 | 0.15 | 0 | 1.2 | 1.5 | Ti: 0.15 |
| k | 0.05 | 0.15 | 0 | 1.2 | 1.5 | In: 0.05 |
| l | 0.05 | 0.15 | 0 | 1.2 | 1.5 | Sn: 0.05 |

TABLE 8

| | Composition (mass %) | | | | | |
|---|---|---|---|---|---|---|
| No. | Si | Fe | Cu | Mn | Zn | Other |
| m | 0.05 | 0.15 | 0 | 1.2 | 0.3 | |
| n | 0.05 | 0.15 | 0 | 1.2 | 3.5 | |
| o | 1.3 | 0.15 | 0 | 1.2 | 1.5 | |
| p | 0.05 | 0.15 | 0 | 2.0 | 1.5 | |
| q | 0.05 | 1.0 | 0 | 1.2 | 1.5 | |
| r | 0.05 | 0.15 | 0 | 1.2 | 1.5 | Mg: 0.6 |
| s | 0.05 | 0.15 | 0.5 | 1.2 | 1.5 | |
| t | 0.05 | 0.15 | 0 | 1.2 | 1.5 | Cr: 0.35 |
| u | 0.05 | 0.15 | 0 | 1.2 | 1.5 | Zr: 0.35 |
| v | 0.05 | 0.15 | 0 | 1.2 | 1.5 | Ti: 0.35 |
| w | 0.05 | 0.15 | 0 | 1.2 | 1.5 | In: 0.15 |
| x | 0.05 | 0.15 | 0 | 1.2 | 1.5 | Sn: 0.15 |

TABLE 9

| Test material | Refrigerant tube alloy | Si powder (g/m²) | KZnF₃ powder (g/m²) | Zn-free flux powder (g/m²) | Acrylic resin binder (%) | Mixed powder (g/m²) | Fin material alloy | Problem during core production | Evaluation |
|---|---|---|---|---|---|---|---|---|---|
| 1 | A | 3 | 5 | 5 | 20 | 13 | c | No | Acceptable |
| 2 | B | 3 | 5 | 5 | 20 | 13 | c | No | Acceptable |
| 3 | C | 3 | 5 | 5 | 20 | 13 | c | No | Acceptable |
| 4 | D | 3 | 5 | 5 | 20 | 13 | c | No | Acceptable |
| 5 | E | 3 | 5 | 5 | 20 | 13 | c | No | Acceptable |
| 6 | F | 3 | 5 | 5 | 20 | 13 | c | No | Acceptable |
| 7 | G | 3 | 5 | 5 | 20 | 13 | c | No | Acceptable |
| 8 | H | 3 | 5 | 5 | 20 | 13 | c | No | Acceptable |
| 9 | I | 3 | 5 | 5 | 20 | 13 | c | No | Acceptable |
| 10 | J | 3 | 5 | 5 | 20 | 13 | c | No | Acceptable |
| 11 | K | 3 | 5 | 5 | 20 | 13 | c | No | Acceptable |
| 12 | C | 1 | 5 | 5 | 20 | 11 | c | No | Acceptable |
| 13 | C | 4 | 5 | 5 | 20 | 14 | c | No | Acceptable |
| 14 | C | 3 | 1 | 9 | 20 | 13 | c | No | Acceptable |
| 15 | C | 3 | 3 | 7 | 20 | 13 | c | No | Acceptable |
| 16 | C | 3 | 7 | 3 | 20 | 13 | c | No | Acceptable |
| 17 | C | 3 | 9 | 1 | 20 | 13 | c | No | Acceptable |
| 18 | C | 3 | 5 | 5 | 20 | 13 | a | No | Acceptable |
| 19 | C | 3 | 5 | 5 | 20 | 13 | b | No | Acceptable |
| 20 | C | 3 | 5 | 5 | 20 | 13 | d | No | Acceptable |
| 21 | C | 3 | 5 | 5 | 20 | 13 | e | No | Acceptable |

TABLE 10

| Test material | Refrigerant tube alloy | Si powder (g/m²) | KZnF₃ powder (g/m²) | Zn-free flux powder (g/m²) | Acrylic resin binder (%) | Mixed powder (g/m²) | Fin material alloy | Problem during core production | Evaluation |
|---|---|---|---|---|---|---|---|---|---|
| 22 | C | 0.5 | 5 | 5 | 20 | 10.5 | c | Fin was not bonded | Unacceptable |
| 23 | C | 10 | 5 | 5 | 20 | 20 | c | Fin melted during brazing | Unacceptable |
| 24 | C | 3 | 0.5 | 8.5 | 20 | 12 | c | No | Acceptable |
| 25 | C | 3 | 10 | 1 | 20 | 14 | c | No | Acceptable |
| 26 | C | 3 | 5 | 5 | 4 | 13 | c | Coating was separated | Unacceptable |
| 27 | C | 3 | 5 | 5 | 45 | 13 | c | Defective brazing | Unacceptable |
| 28 | C | 2 | 1 | 1 | 20 | 4 | c | Defective brazing (flux insufficiency) | Unacceptable |
| 29 | C | 4 | 9 | 9 | 20 | 22 | c | Dimensions of core decreased | Unacceptable |
| 30 | C | 3 | 5 | 5 | 20 | 13 | m | No | Acceptable |
| 31 | C | 3 | 5 | 5 | 20 | 13 | n | No | Acceptable |
| 32 | C | 3 | 5 | 5 | 20 | 13 | o | Fin melted during brazing | Unacceptable |
| 33 | C | 3 | 5 | 5 | 20 | 13 | p | Fin broke during forming | Unacceptable |
| 34 | C | 3 | 5 | 5 | 20 | 13 | q | No | Acceptable |
| 35 | C | 3 | 5 | 5 | 20 | 13 | r | Fin was not bonded | Unacceptable |
| 36 | C | 3 | 5 | 5 | 20 | 13 | s | No | Acceptable |
| 37 | C | 3 | 5 | 5 | 20 | 13 | t | Fin broke during forming | Unacceptable |
| 38 | C | 3 | 5 | 5 | 20 | 13 | u | Fin broke during forming | Unacceptable |
| 39 | C | 3 | 5 | 5 | 20 | 13 | v | Fin broke during forming | Unacceptable |
| 40 | C | 3 | 5 | 5 | 20 | 13 | w | No | Acceptable |
| 41 | C | 3 | 5 | 5 | 20 | 13 | x | No | Acceptable |
| 42 | T | 3 | 5 | 5 | 20 | 13 | c | No | Acceptable |
| 43 | T | 3 | 5 | 5 | 20 | 13 | c | No | Acceptable |

The resulting heat exchanger core (test material) was subjected to the following tests 4, 5, and 6. Note that the test was not performed when a problem occurred when producing the heat exchanger core.

Test 4

The heat exchanger core (test material) was subjected to a leakage test to determine the presence or absence of leakage due to defective brazing at the joint between the header and the refrigerant tube. The results are shown in Tables 11 and 12. A case where leakage due to defective brazing did not occur was evaluated as "Acceptable", and a case where leakage due to defective brazing occurred was evaluated as "Unacceptable".

Test 5

The potentials of the surface area and the deep area of the refrigerant tube, the potential of the fin joint fillet, and the potential of the fin included in the heat exchanger core (test material) were measured. The potential of the surface area of the refrigerant tube and the potential of the surface of the fin material were measured directly after brazing. The potential of the deep area of the refrigerant tube was determined by facing the refrigerant tube to a depth of 150 μm from the surface, and measuring the potential of the area in which Zn diffusion did not occur. The potential of the fin joint fillet was measured in a state in which the fillet was exposed, and the area other than the fillet was masked with an insulating coating material. When measuring the potential of the material, the material was immersed in a 5% NaCl aqueous solution (the pH thereof was adjusted to 3 using acetic acid) for 24 hours, and the average value of stable measured values obtained after immersing the material for 10 hours or more was employed. A saturated calomel electrode was used as a reference electrode. The results are shown in Tables 11 and 12. A case where the potential decreased in order from the deep area of the refrigerant tube, the surface area of the refrigerant tube, the fin joint fillet, and the fin material was evaluated as "Acceptable", and a case where the potential did not decrease in order from the deep area of the refrigerant tube, the surface area of the refrigerant tube, the fin joint fillet, and the fin material was evaluated as "Unacceptable".

TABLE 11

| Test material | Leakage at joint between header and refrigerant tube | Evaluation | Potential of refrigerant tube Deep area (mV vs. SCE) | Potential of refrigerant tube Surface area (mV vs. SCE) | Potential of fin joint fillet (mV vs. SCE) | Potential of fin material (mV vs. SCE) | Potential order |
|---|---|---|---|---|---|---|---|
| 1 | No | Acceptable | −750 | −800 | −805 | −815 | Acceptable |
| 2 | No | Acceptable | −720 | −770 | −805 | −815 | Acceptable |
| 3 | No | Acceptable | −740 | −790 | −805 | −815 | Acceptable |
| 4 | No | Acceptable | −740 | −790 | −805 | −815 | Acceptable |
| 5 | No | Acceptable | −740 | −790 | −805 | −815 | Acceptable |
| 6 | No | Acceptable | −740 | −790 | −805 | −815 | Acceptable |
| 7 | No | Acceptable | −740 | −790 | −805 | −815 | Acceptable |
| 8 | No | Acceptable | −740 | −790 | −805 | −815 | Acceptable |
| 9 | No | Acceptable | −740 | −790 | −805 | −815 | Acceptable |
| 10 | No | Acceptable | −740 | −790 | −805 | −815 | Acceptable |
| 11 | No | Acceptable | −730 | −785 | −805 | −815 | Acceptable |
| 12 | No | Acceptable | −740 | −790 | −805 | −815 | Acceptable |
| 13 | No | Acceptable | −740 | −790 | −805 | −815 | Acceptable |
| 14 | No | Acceptable | −740 | −770 | −780 | −815 | Acceptable |
| 15 | No | Acceptable | −740 | −780 | −790 | −815 | Acceptable |
| 16 | No | Acceptable | −740 | −800 | −810 | −815 | Acceptable |
| 17 | No | Acceptable | −740 | −810 | −813 | −815 | Acceptable |
| 18 | No | Acceptable | −740 | −780 | −783 | −785 | Acceptable |
| 19 | No | Acceptable | −740 | −800 | −850 | −900 | Acceptable |
| 20 | No | Acceptable | −740 | −795 | −798 | −800 | Acceptable |
| 21 | No | Acceptable | −740 | −790 | −805 | −810 | Acceptable |

TABLE 12

| Test material | Leakage at joint between header and refrigerant tube | Evaluation | Potential of refrigerant tube Deep area (mV vs. SCE) | Potential of refrigerant tube Surface area (mV vs. SCE) | Potential of fin joint fillet (mV vs. SCE) | Potential of fin material (mV vs. SCE) | Potential order |
|---|---|---|---|---|---|---|---|
| 22 | Not measured | | | | Not measured | | |
| 23 | Not measured | | | | Not measured | | |
| 24 | No | Acceptable | −740 | −740 | −750 | −815 | Unacceptable |
| 25 | No | Acceptable | −740 | −815 | −825 | −815 | Unacceptable |
| 26 | Not measured | | | | Not measured | | |
| 27 | Not measured | | | | Not measured | | |
| 28 | Not measured | | | | Not measured | | |
| 29 | Not measured | | | | Not measured | | |
| 30 | No | Acceptable | −740 | −775 | −780 | −730 | Unacceptable |
| 31 | No | Acceptable | −740 | −810 | −860 | −950 | Acceptable |
| 32 | Not measured | | | | Not measured | | |
| 33 | Not measured | | | | Not measured | | |
| 34 | No | Acceptable | −740 | −790 | −805 | −815 | Acceptable |
| 35 | Not measured | | | | | | |
| 36 | No | Acceptable | −740 | −790 | −800 | −705 | Unacceptable |
| 37 | Not measured | | | | Not measured | | |
| 38 | Not measured | | | | Not measured | | |
| 39 | Not measured | | | | Not measured | | |
| 40 | No | Acceptable | −740 | −790 | −805 | −865 | Acceptable |
| 41 | No | Acceptable | −740 | −790 | −805 | −865 | Acceptable |
| 42 | Occurred | Unacceptable | | | Not measured | | |
| 43 | Occurred | Unacceptable | | | Not measured | | |

Test 6

The heat exchanger core (test material) was subjected to the SWAAT test specified in ASTM-G85-Annex A3 and the following CCT test for 1000 hours. In the CCT test, a 5% salt solution (the pH thereof was adjusted to 3 using acetic acid) was used as a test solution. After spraying the test solution onto the heat exchanger core at 35° C. (atmospheric temperature) for 2 hours, the heat exchanger core was dried at 60° C. for 4 hours, and wetted at 50° C. for 2 hours at a relative humidity of 95% or more. The above cycle was repeated. The maximum corrosion depth of the refrigerant tube, the separation state of the fin, and the corrosion state of the fin after the test are shown in Tables 13 and 14. A case where the maximum corrosion depth of the refrigerant tube was 0.05 mm or less was evaluated as "Excellent", a case where the maximum corrosion depth of the refrigerant tube was more than 0.05 mm and 0.10 mm or less was evaluated as "Good", a case where the maximum corrosion depth of the refrigerant tube was more than 0.10 mm and 0.20 mm or less was evaluated as "Average", and a case where the maximum corrosion depth of the refrigerant tube was more than 0.20 mm was evaluated as "Bad". The item "Separation of tin" indicates separation or non-separation of the fin. A case where the fin was corroded to only a small extent was evaluated as "Excellent", a case where the fin was slightly corroded was evaluated as "Good", a case where the fin was corroded to some extent was evaluated as "Average", and a case where the fin was significantly corroded was evaluated as "Bad".

TABLE 13

| Test material | SWAAT-1000 h test | | | CCT-1000 h test | | |
|---|---|---|---|---|---|---|
| | Maximum corrosion depth of tube (mm) | Separation of fin | Corrosion of fin | Maximum corrosion depth of tube (mm) | Separation of fin | Corrosion of fin |
| 1 | 0.05 | Excellent | No | Good | 0.05 | Excellent | No | Excellent |
| 2 | 0.05 | Excellent | No | Good | 0.05 | Excellent | No | Excellent |
| 3 | 0.05 | Excellent | No | Good | 0.05 | Excellent | No | Excellent |
| 4 | 0.03 | Excellent | No | Good | 0.03 | Excellent | No | Excellent |
| 5 | 0.03 | Excellent | No | Good | 0.03 | Excellent | No | Excellent |
| 6 | 0.03 | Excellent | No | Good | 0.03 | Excellent | No | Excellent |
| 7 | 0.03 | Excellent | No | Good | 0.03 | Excellent | No | Excellent |
| 8 | 0.03 | Excellent | No | Good | 0.03 | Excellent | No | Excellent |
| 9 | 0.03 | Excellent | No | Good | 0.03 | Excellent | No | Excellent |
| 10 | 0.03 | Excellent | No | Good | 0.03 | Excellent | No | Excellent |
| 11 | 0.05 | Excellent | No | Good | 0.05 | Excellent | No | Excellent |
| 12 | 0.05 | Excellent | No | Good | 0.05 | Excellent | No | Excellent |
| 13 | 0.05 | Excellent | No | Good | 0.05 | Excellent | No | Excellent |
| 14 | 0.06 | Good | No | Good | 0.06 | Good | No | Excellent |
| 15 | 0.05 | Excellent | No | Good | 0.05 | Excellent | No | Excellent |
| 16 | 0.05 | Excellent | No | Good | 0.05 | Excellent | No | Excellent |
| 17 | 0.04 | Excellent | No | Good | 0.04 | Excellent | No | Excellent |
| 18 | 0.05 | Excellent | No | Good | 0.05 | Excellent | No | Excellent |
| 19 | 0.05 | Excellent | No | Good | 0.05 | Excellent | No | Excellent |
| 20 | 0.05 | Excellent | No | Good | 0.05 | Excellent | No | Excellent |
| 21 | 0.05 | Excellent | No | Good | 0.05 | Excellent | No | Excellent |

TABLE 14

| Test material | SWAAT-1000 h test | | | CCT-1000 h test | | |
|---|---|---|---|---|---|---|
| | Maximum corrosion depth of tube (mm) | Separation of fin | Corrosion of fin | Maximum corrosion depth of tube (mm) | Separation of fin | Corrosion of fin |
| 22 | Not measured | | | | | |
| 23 | Not measured | | | | | |
| 24 | 0.30 | Bad | No | Bad | 0.30 | Bad | No | Bad |
| 25 | 0.05 | Excellent | Yes | Good | 0.05 | Excellent | Yes | Excellent |
| 26 | Not measured | | | | | |
| 27 | Not measured | | | | | |
| 28 | Not measured | | | | | |
| 29 | Not measured | | | | | |
| 30 | 0.30 | Bad | Yes | Good | 0.15 | Average | Yes | Excellent |
| 31 | 0.05 | Excellent | No | Bad | 0.05 | Excellent | No | Bad |
| 32 | Not measured | | | | | |
| 33 | Not measured | | | | | |
| 34 | 0.05 | Excellent | No | Bad | 0.05 | Excellent | No | Bad |
| 35 | Not measured | | | | | |
| 36 | 0.30 | Bad | Yes | Bad | 0.15 | Average | Yes | Bad |
| 37 | Not measured | | | | | |
| 38 | Not measured | | | | | |
| 39 | Not measured | | | | | |
| 40 | 0.05 | Excellent | No | Bad | 0.05 | Excellent | No | Bad |
| 41 | 0.05 | Excellent | No | Bad | 0.05 | Excellent | No | Bad |
| 42 | Not measured | | | | | |
| 43 | Not measured | | | | | |

As shown in Tables 11 to 14, the inventive test materials (heat exchanger cores) No. 1 to 21 did not show leakage at the joint between the header and the refrigerant tube when subjected to the leakage test after brazing. In contrast, the test materials No. 42 and 43 showed leakage since the refrigerant tube containing a pure aluminum alloy or Cu was used.

In the inventive test materials (heat exchanger cores) No. 1 to 21, the potential of the surface area of the refrigerant tube was lower than that of the deep area of the refrigerant tube, the potential of the fin joint fillet was lower than that of the surface area of the refrigerant tube, and the potential of the fin material was lower than that of the joint fillet. In the test materials (heat exchanger cores) No. 22 to 43, a case where a Zn diffusion layer was not sufficiently formed in the surface area of the refrigerant tube, and a sufficient potential difference was not obtained between the surface area and the deep area of the refrigerant tube, a case where the fin joint fillet had the lowest potential, or a case where the fin material had the lowest potential, but the potential of the fin material was significantly lower than the potential of the refrigerant tube or the fin joint fillet was observed.

When subjecting the inventive test materials (heat exchanger cores) No. 1 to 21 to the SWAAT test, the maximum corrosion depth was small (i.e., excellent corrosion resistance was obtained) since a sufficient potential difference was obtained between the surface area and the deep area of the refrigerant tube. Since the potential of the fin joint fillet was between the surface area of the refrigerant tube and the fin material, separation of the fin due to preferential corrosion of the fillet did not occur.

In the SWAAT test, since the fin exhibits a sacrificial anode effect, corrosion of the fin material differs depending on the potential difference between the surface area of the refrigerant tube and the fin material. In the inventive heat exchanger cores, the fin material was corroded to only a small extent due to an appropriate potential difference between the surface area of the refrigerant tube and the fin material. Moreover, since the potential of the fin material was lower than that of the deep area of the refrigerant tube, the fin material did not accelerate corrosion of the refrigerant tube as a cathode.

The test materials (heat exchanger cores) No. 24, 30, and 36 showed a large maximum corrosion depth since a sufficient potential difference was not obtained between the surface area and the deep area of the refrigerant tube, or the potential of the fin material was higher than that of the deep area of the refrigerant tube. Separation of the fin occurred in the test materials (heat exchanger cores) No. 25, 30, and 36 in which the fin joint fillet had the lowest potential.

The fin material showed significant corrosion in the test materials (heat exchanger cores) No. 24, 31, 34, 36, 40, and 41 in which the potential of the fin material was significantly lower than that of the surface area of the refrigerant tube or the fin joint fillet due to a high Zn content, a high In content, and a high Sn content, or the fin material exhibited poor self-corrosion resistance due to a high Fe content and a high Cu content.

The CCT test conditions are similar to the conditions in the actual environment due to the drying step. However, the fin may not exhibit a sacrificial anode effect. When subjecting the inventive test materials (heat exchanger cores) No. 1 to 21 to the CCT test, the maximum corrosion depth was small (i.e., excellent corrosion resistance was obtained) in the same manner as in the SWAAT test since a sufficient potential difference was obtained between the surface area and the deep area of the refrigerant tube. Moreover, separation of the fin due to corrosion was not observed, and the fin material was corroded to only a small extent. In the heat exchanger cores No. 22 to 43, the maximum corrosion depth of the refrigerant tube was large when the potential difference between the surface area and the deep area of the refrigerant tube was insufficient. The same tendency as that of the SWAAT test was observed for separation of the fin and corrosion of the fin material.

Obviously, numerous modifications and variations of the present invention are possible in the light of the above teachings. It is therefore to be understood that within the scope of the appended claims, the invention may be practised otherwise than as specifically described herein.

What is claimed is:

1. A method for producing an aluminum alloy heat exchanger comprising applying a coating material prepared by mixing an Si powder, a flux powder, and a binder to a surface of a multiport flat refrigerant tube, assembling an aluminum alloy bare fin with the multiport flat refrigerant tube, and brazing the multiport flat refrigerant tube and the aluminum alloy bare fin to obtain an aluminum alloy heat exchanger, the multiport flat refrigerant tube being formed of an aluminum alloy extruded material that comprises 0.6 to 1.7 mass % of Mn, less than 0.10 mass % of Si, and less than 0.05 mass % of Cu, with the balance being Al and unavoidable impurities, the aluminum alloy bare fin being a corrugated fin that is obtained by forming an Al—Mn—Zn alloy material, the coating material being prepared by mixing an Si powder, a Zn-containing compound flux powder, a Zn-free compound flux powder, and a binder, the Si powder being applied in an amount of 1 to 4 $g/m^2$, the Zn-containing compound flux powder being applied in an amount of 1 to 9 $g/m^2$, the Zn-free compound flux powder being applied in an amount of 1 to 9 $g/m^2$, the Si powder, the Zn-containing compound flux powder, and the Zn-free compound flux powder being applied in an amount of 5 to 20 $g/m^2$ in total, a content of the binder in the coating material being 5 to 40%, and the aluminum alloy heat exchanger obtained by brazing having a configuration in which a deep area of the refrigerant tube has the highest potential, and the potential decreases in order from a surface area of the refrigerant tube, a fin joint fillet, and the fin.

2. The method for producing an aluminum alloy heat exchanger according to claim 1, wherein the aluminum alloy extruded material that forms the refrigerant tube further comprises one or more elements among 0.30 mass % or less of Ti, 0.10 mass % or less of Sr, and 0.30 mass % or less of Zr.

3. The method for producing an aluminum alloy heat exchanger according to claim 1, wherein the Si powder has a maximum particle size of 35 μm or less.

4. The method for producing an aluminum alloy heat exchanger according to claim 1, wherein the Zn-containing compound flux powder is $KZnF_3$.

5. The method for producing an aluminum alloy heat exchanger according to claim 1, wherein the Zn-free compound flux powder is a potassium fluoroaluminate.

6. The method for producing an aluminum alloy heat exchanger according to claim 1, wherein the aluminum alloy bare fin is formed of an aluminum alloy that comprises 0.1 to 1.8 mass % of Mn and 0.8 to 3.0 mass % of Zn, with the balance being Al and unavoidable impurities.

7. The method for producing an aluminum alloy heat exchanger according to claim 6, wherein the aluminum alloy that forms the aluminum alloy bare fin further comprises one or more elements among 0.001 to 0.10 mass % of In and 0.001 to 0.10 mass % of Sn.

8. The method for producing an aluminum alloy heat exchanger according to claim 1, wherein the aluminum alloy bare fin is formed of an aluminum alloy that comprises 0.1 to 1.8 mass % of Mn, 0.8 to 3.0 mass % of Zn, and one or more elements among 0.1 to 1.2 mass % of Si, 0.01 to 0.8 mass % of Fe, 0.05 to 0.5 mass % of Mg, 0.3 mass % or less of Cu, 0.3 mass % or less of Cr, 0.3 mass % or less of Zr, and 0.3 mass % or less of Ti, with the balance being Al and unavoidable impurities.

9. The method for producing an aluminum alloy heat exchanger according to claim 8, wherein the aluminum alloy that forms the aluminum alloy bare fin further comprises one or more elements among 0.001 to 0.10 mass % of In and 0.001 to 0.10 mass % of Sn.

10. The method for producing an aluminum alloy heat exchanger according to claim 1, wherein the aluminum alloy extruded material that forms the refrigerant tube is obtained by casting an ingot, subjecting the ingot to a homogenization heat treatment that holds the ingot at 400 to 650° C. for 4 hours or more, and hot-extruding the ingot.

11. The method for producing an aluminum alloy heat exchanger according to claim 1, wherein the aluminum alloy extruded material that forms the refrigerant tube is obtained by casting an ingot, subjecting the ingot to a homogenization heat treatment, and hot-extruding the ingot, the homogenization heat treatment including a first-stage heat treatment that holds the ingot at 550 to 650° C. for 2 hours or more, and a second-stage heat treatment that cools the ingot subjected to the first-stage heat treatment to 400 to 550° C., and holds the ingot at 400 to 550° C. for 3 hours or more.

12. The method for producing an aluminum alloy heat exchanger according to claim 1, wherein the aluminum alloy extruded material that forms the refrigerant tube is obtained by casting an ingot, subjecting the ingot to a homogenization heat treatment, and hot-extruding the ingot, the homogenization heat treatment including a first-stage heat treatment that holds the ingot at 550 to 650° C. for 2 hours or more, and a second-stage heat treatment that cools the ingot subjected to the first-stage heat treatment to 200° C. or less, and holds the ingot at 400 to 550° C. for 3 hours or more.

13. The method for producing an aluminum alloy heat exchanger according to claim 1, wherein the Si powder has a maximum particle size of 35 μm or less, the Zn-containing compound flux powder is $KZnF_3$, and the Zn-free compound flux powder is a potassium fluoroaluminate.

14. The method for producing an aluminum alloy heat exchanger according to claim 13, wherein the aluminum alloy bare fin is formed of an aluminum alloy that comprises 0.1 to 1.8 mass % of Mn and 0.8 to 3.0 mass % of Zn, with the balance being Al and unavoidable impurities.

15. The method for producing an aluminum alloy heat exchanger according to claim 14, wherein the Si powder has a maximum particle size of 35 μm or less, the Zn-containing compound flux powder is $KZnF_3$, the Zn-free compound flux powder is a potassium fluoroaluminate, and the aluminum alloy extruded material that forms the refrigerant tube is obtained by casting an ingot, subjecting the ingot to a homogenization heat treatment that holds the ingot at 400 to 650° C. for 4 hours or more, and hot-extruding the ingot.

16. The method for producing an aluminum alloy heat exchanger according to claim 14, wherein the Si powder has a maximum particle size of 35 μm or less, the Zn-containing compound flux powder is $KZnF_3$, the Zn-free compound flux powder is a potassium fluoroaluminate, and the aluminum alloy extruded material that forms the refrigerant tube is obtained by casting an ingot, subjecting the ingot to a homogenization heat treatment, and hot-extruding the ingot, the homogenization heat treatment including a first-stage heat treatment that holds the ingot at 550 to 650° C. for 2 hours or more, and a second-stage heat treatment that cools the ingot subjected to the first-stage heat treatment to 400 to 550° C., and holds the ingot at 400 to 550° C. for 3 hours or more.

17. The method for producing an aluminum alloy heat exchanger according to claim 14, wherein the Si powder has a maximum particle size of 35 μm or less, the Zn-containing compound flux powder is $KZnF_3$, the Zn-free compound flux powder is a potassium fluoroaluminate, and the aluminum alloy extruded material that forms the refrigerant tube is obtained by casting an ingot, subjecting the ingot to a homogenization heat treatment, and hot-extruding the ingot, the homogenization heat treatment including a first-stage heat treatment that holds the ingot at 550 to 650° C. for 2 hours or more, and a second-stage heat treatment that cools the ingot subjected to the first-stage heat treatment to 200° C. or less, and holds the ingot at 400 to 550° C. for 3 hours or more.

18. The method for producing an aluminum alloy heat exchanger according to claim 13, wherein the aluminum alloy bare fin is formed of an aluminum alloy that comprises 0.1 to 1.8 mass % of Mn, 0.8 to 3.0 mass % of Zn, and one or more elements among 0.1 to 1.2 mass % of Si, 0.01 to 0.8 mass % of Fe, 0.05 to 0.5 mass % of Mg, 0.3 mass % or less of Cu, 0.3 mass % or less of Cr, 0.3 mass % or less of Zr, and 0.3 mass % or less of Ti, with the balance being Al and unavoidable impurities.

19. The method for producing an aluminum alloy heat exchanger according to claim 18, wherein the Si powder has a maximum particle size of 35 μm or less, the Zn-containing compound flux powder is $KZnF_3$, the Zn-free compound flux powder is a potassium fluoroaluminate, and the aluminum alloy extruded material that forms the refrigerant tube is obtained by casting an ingot, subjecting the ingot to a homogenization heat treatment that holds the ingot at 400 to 650° C. for 4 hours or more, and hot-extruding the ingot.

20. The method for producing an aluminum alloy heat exchanger according to claim 18, wherein the Si powder has a maximum particle size of 35 μm or less, the Zn-containing compound flux powder is $KZnF_3$, the Zn-free compound flux powder is a potassium fluoroaluminate, and the aluminum alloy extruded material that forms the refrigerant tube is obtained by casting an ingot, subjecting the ingot to a homogenization heat treatment, and hot-extruding the ingot, the homogenization heat treatment including a first-stage heat treatment that holds the ingot at 550 to 650° C. for 2 hours or more, and a second-stage heat treatment that cools the ingot subjected to the first-stage heat treatment to 400 to 550° C., and holds the ingot at 400 to 550° C. for 3 hours or more.

21. The method for producing an aluminum alloy heat exchanger according to claim 18, wherein the Si powder has a maximum particle size of 35 μm or less, the Zn-containing compound flux powder is $KZnF_3$, the Zn-free compound flux powder is a potassium fluoroaluminate, and the aluminum alloy extruded material that forms the refrigerant tube is obtained by casting an ingot, subjecting the ingot to a homogenization heat treatment, and hot-extruding the ingot, the homogenization heat treatment including a first-stage heat treatment that holds the ingot at 550 to 650° C. for 2 hours or more, and a second-stage heat treatment that cools the ingot subjected to the first-stage heat treatment to 200° C. or less, and holds the ingot at 400 to 550° C. for 3 hours or more.

22. The method for producing an aluminum alloy heat exchanger according to claim 13, wherein the aluminum alloy extruded material that forms the refrigerant tube is obtained by casting an ingot, subjecting the ingot to a homogenization heat treatment that holds the ingot at 400 to 650° C. for 4 hours or more, and hot-extruding the ingot.

23. The method for producing an aluminum alloy heat exchanger according to claim 13, wherein the aluminum alloy extruded material that forms the refrigerant tube is obtained by casting an ingot, subjecting the ingot to a homogenization heat treatment, and hot-extruding the ingot, the homogenization heat treatment including a first-stage heat treatment that holds the ingot at 550 to 650° C. for 2 hours or more, and a second-stage heat treatment that cools the ingot subjected to the first-stage heat treatment to 400 to 550° C., and holds the ingot at 400 to 550° C. for 3 hours or more.

24. The method for producing an aluminum alloy heat exchanger according to claim 13, wherein the aluminum alloy extruded material that forms the refrigerant tube is obtained by casting an ingot, subjecting the ingot to a homogenization heat treatment, and hot-extruding the ingot, the homogenization heat treatment including a first-stage heat treatment that holds the ingot at 550 to 650° C. for 2 hours or more, and a second-stage heat treatment that cools the ingot subjected to the first-stage heat treatment to 200° C. or less, and holds the ingot at 400 to 550° C. for 3 hours or more.

* * * * *